United States Patent [19]

Elliason et al.

[11] Patent Number: 5,598,349

[45] Date of Patent: Jan. 28, 1997

[54] RESPONDING TO PRICING SIGNALS FROM A POWER SUPPLIER USING MIXED ADD/SHED AND PROFILE SETBACK DELTA SCHEMES

[75] Inventors: Kurt L. Elliason; Robert J. Schnell, both of Plymouth, Minn.

[73] Assignee: Honeywell Inc., Minneapolis, Minn.

[21] Appl. No.: 329,128

[22] Filed: Oct. 25, 1994

[51] Int. Cl.$^6$ .................................................. G06F 17/00
[52] U.S. Cl. ..................................... 364/492; 386/464.22
[58] Field of Search ........................... 364/492, 511, 364/464.04, 493; 307/31, 32, 35, 78, 39, 62, 40, 41; 340/823.06, 870.02, 870.03, 870.16

[56] References Cited

U.S. PATENT DOCUMENTS

| | | |
|---|---|---|
| 3,656,112 | 4/1972 | Daull . |
| 3,900,842 | 8/1975 | Calabro et al. . |
| 4,301,444 | 11/1981 | Bruckert et al. ............... 340/870.02 |
| 4,341,345 | 7/1982 | Hammer et al. ............... 307/39 |
| 4,345,162 | 8/1982 | Hammer et al. ............... 307/39 |
| 4,429,299 | 1/1984 | Kabut et al. . |
| 4,510,398 | 4/1985 | Culp et al. . |
| 4,513,382 | 4/1985 | Faulkner, Jr. ............... 364/492 |
| 4,556,865 | 12/1985 | Fukasawa et al. . |
| 4,620,283 | 10/1986 | Butt et al. ............... 364/493 |
| 4,642,607 | 2/1987 | Strom et al. . |
| 4,686,630 | 8/1987 | Marsland et al. ............... 364/492 |
| 4,916,328 | 4/1990 | Culp, III . |
| 5,003,457 | 3/1991 | Ikei et al. . |
| 5,289,362 | 2/1994 | Liebl et al. . |

OTHER PUBLICATIONS

Reza S. Raji "Smart Networks for Control", IEEE Spectrum, Jun. 1994.

Primary Examiner—James P. Trammell
Attorney, Agent, or Firm—Robert B. Leonard

[57] ABSTRACT

A method for employing utility-supplied information relies on two schemes for accommodating such pricing information. All subsystems in a building function based on the individual controller responsible for that subsystem and the user-defined predetermined responses stored in memory. Direct load control and user overrides are allowed. Where appropriate, a setback is applied across subsystems that operate on setpoints, and other loads are add/shed based on their value vis-à-vis interpreted utility pricing information signals.

6 Claims, 17 Drawing Sheets

5,598,349

RESPONDING TO PRICING SIGNALS FROM A POWER SUPPLIER USING MIXED ADD/SHED AND PROFILE SETBACK DELTA SCHEMES

This invention relates to reducing energy costs (in conjunction with time-of-use pricing with rates that vary according to energy costs) and has particular application to home control and building control in general and is useful in areas supplied by electric utilities that wish to engage in demand side management of their area. It is particularly addressed to add/shed and direct load control and pricing profile setback control, both with individual processors for subsystems to which such load control may be applied, and for distributed load control.

BACKGROUND OF THE INVENTION

As it becomes more expensive for electricity providers to increase generation, distribution and transmission capacity, a number of strategies for coping with increasing electrical demand have emerged. One of these is called demand side management in which the users of electricity themselves are adapted to reduce the amount of electricity they use during times of peak power usage as well as in other similar situations. The invention herein provides a way to adapt users of electricity to reduce their demand through add/shed, direct and setback profile strategies which can be applied in real time and in cooperation with consumer needs. Thus by communicating the (time-of-use) energy price rate or tier or other information signals via an interface to a control system within the customer's premises, the control system can reduce the energy consumption within the premise during times when the cost of energy is high. The utility, in turn, can reduce the necessary generating capacity for a given area.

Previous ways to deal with related problems of reducing energy consumption in buildings using add/shed strategies, or in general, are described in U.S. Pat. Nos. 4,510,398; 4,916,328 and 4,909,041. Nevertheless there is no reason why this invention could not be used in non-residential buildings or even in industrial processes that consume electric power, provided that an add/shed load strategy makes sense.

BRIEF DESCRIPTION OF THE DRAWINGS

FIGS. 4b–r (there is no FIG. 4j) are ordered sets of displays in accord with one embodiment of this invention available to the user through the display illustrated in FIG. 4a.

SUMMARY OF THE INVENTION

A controller for controlling the energy-consuming equipment and systems in a building The controller, through receipt of information from a utility, is able to control the energy using apparatus in a way which will reduce energy costs at utility peak demand periods. The controller sends price tier information to the individual controllers for add/shed-able loads (also called subsystems). The controller for the setback profile handler also operates on signals from the utility. Each of these processes related to loads contains or has access to information indicating the appropriate action that the load(s) they are responsible lo for should take based on whether there is a user override and whether there is direct utility control as well as on tier information.

All the add/shed decisions will occur based on the predetermined information about the value of the particular processor's load stored in memory associated with the system.

The setback decisions will be based on the relationship of the profile-stored values vis-à-vis the tier value. In a memory, the controller stores price point profiles that contain information indicating the appropriate setpoint-delta, or setpoint limit for each system under the controller for each price point. A price point may be considered a tier, a rate change or rate, or a critical change. Some of this information may be time related and some may be real-time driven by the utility service provider.

The controller in the building will have a gateway for communicating the tier and DLC signals to the controller from the utility. A significant amount of variability is available to the designer employing the invention described herein, which should only be considered limited by the claims.

DETAILED DESCRIPTION OF THE PREFERRED EMBODIMENT

Figure 1:
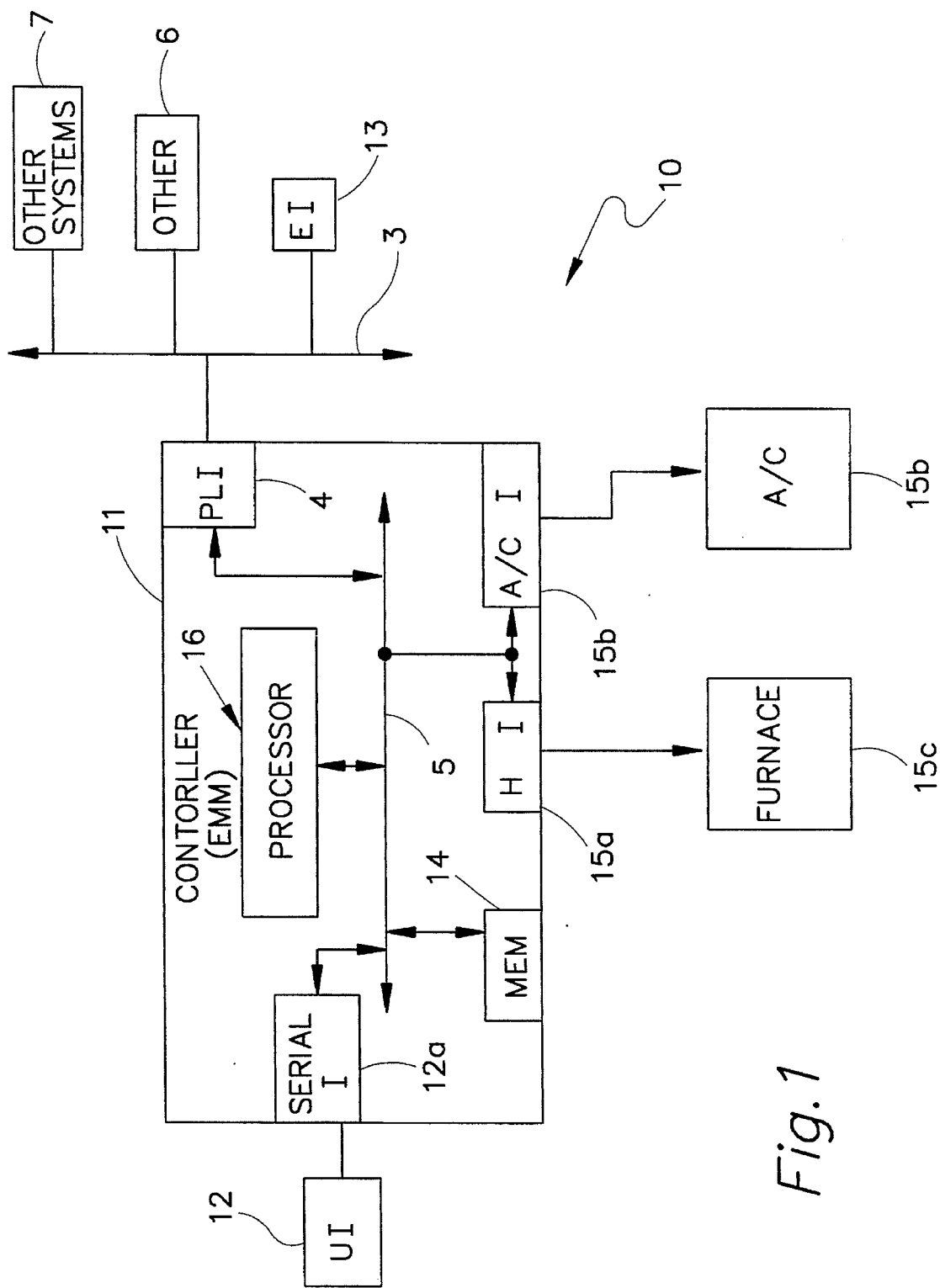
FIG. 1 is a conceptual block diagram of one form of the preferred embodiment of the invention.
Figure 1A:
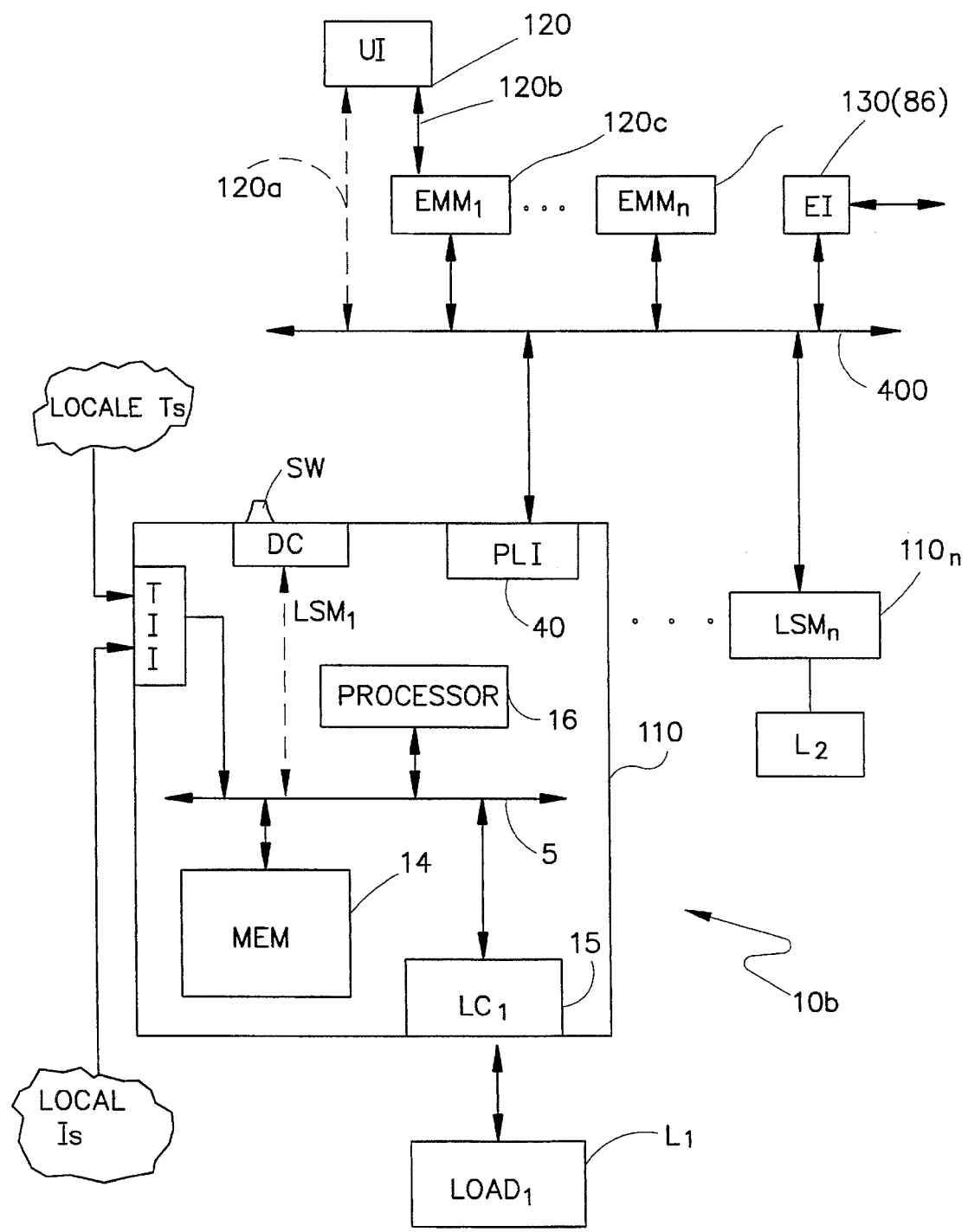
FIG. 1A is a conceptual block diagram of another preferred embodiment of the invention.

FIG. 1A describes a control system 10b including a controller 110, the system 10b having in the preferred embodiment a user interface 120 (which may be connected to the power line through another controller 120c via lines 120b or directly through 120a). The controller 110 preferably includes memory subsystem 14, load control interface 15 and power line interface 40; each of which communicate with a processor 16, either through direct connections or via a controller bus like bus 5. In the preferred embodiment, a communications interface to the utility (called an External Interface) EI 130 is connected to the controller through power line interface 400. The controller 110 may send output signals to load $L_1$, and the user interface 120 as desired by the user for controlling the load that is controlled by the controller 110. Many such controllers 110 to $110_n$ may be included on the power line 400 and each operates to add/shed its load(s) independently.

In one embodiment, the controller 110 may be enhanced and have the benefit of local information for making its decision regarding adding/shedding loads or other tasks it might be assigned. In this Fig., this is illustrated by having a local temperature sensor Ts and a local current sensor Is provide signal input to a current and temperature interface TII which, in turn, can communicate these signals in an intelligible manner to the processor 16 via bus 5.

Controllers for using setback profiles are discussed with reference to FIG. 1. FIG. 1 describes the control system 10 consisting of a controller 11 which, in the preferred embodiment is organized to include a user interface 12, memory subsystem 14, heating plant interface 15a, air conditioner interface 15b and power line interface 4; each of which communicate with a processor 16, either through direct connections or via a controller bus 5. In a preferred embodiment, a communications interface to the utility (called an external interface) 13 is connected to the controller through power line interface 4. The controller 11 may send output signals to heating plant 15a, air conditioner 15b, other systems 6 and 7, and the user interface 12 as desired by the user for controlling the various systems that are controlled by the controller 11.

A preferred bus structure for setting up the interfaces between the controller and the other components is described with reference to FIG. 1B. A number of companies currently provide a universal interface for home control, for example "H-Bus™" (a product available through Honeywell Inc, of Minnesota) which here could operate as controller bus 81. This bus would allow for communications of data and control signals between the various components that may be attached to bus 81 (here, for example, actuator 18 and H-Bus interface 91). The H-Bus™ system, for example, provides for a DC balanced, limited set of code words which all systems may read and which only appropriate systems will react to. Alternative busses are well known and, as the art develops, new busses will become known and the most efficient bus for the appropriate situation should be employed by the designer.

Figure 1B:
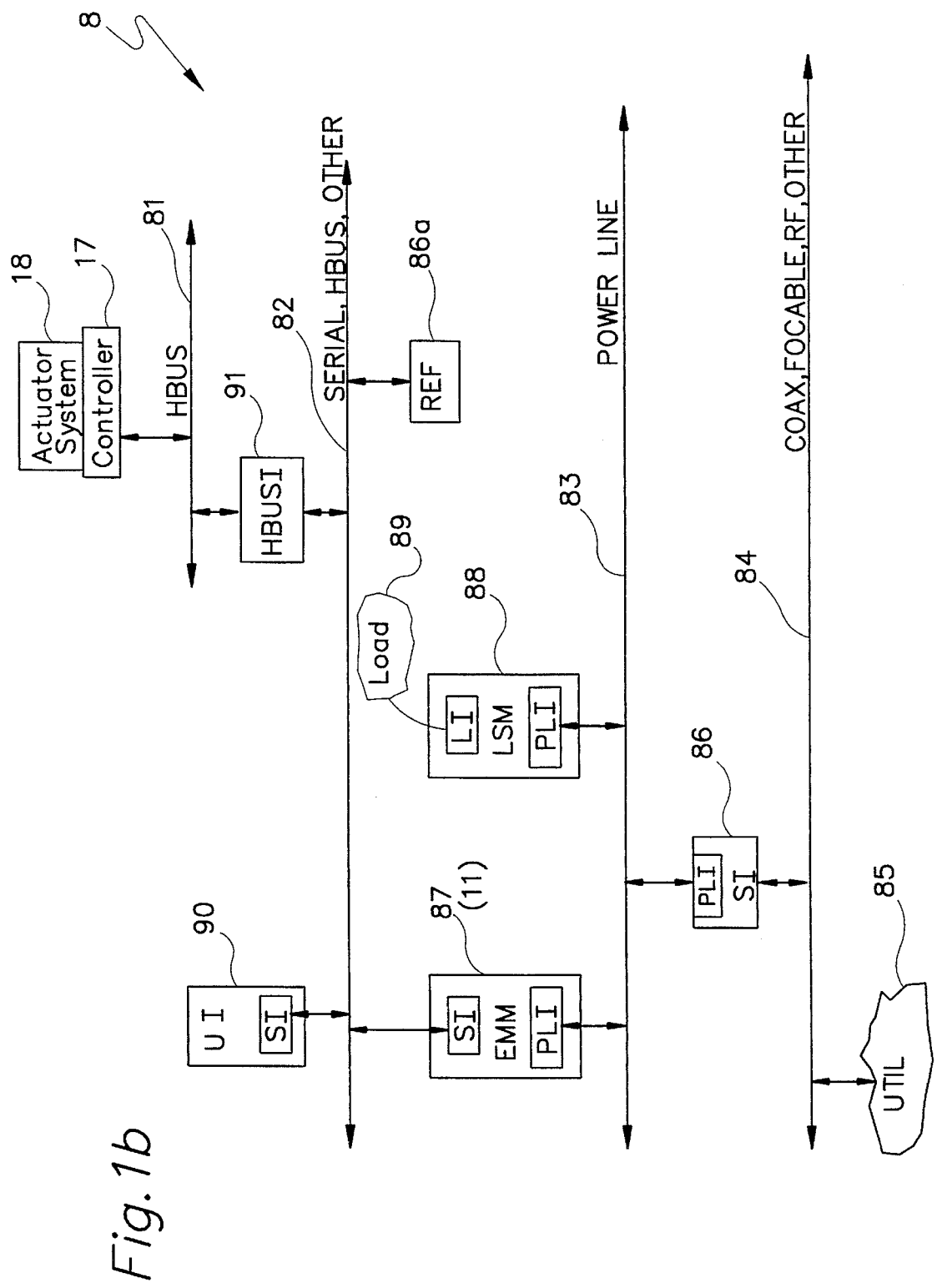
FIG. 1B is a conceptual block diagram of a bus oriented structure for the preferred embodiment.

In the illustration of FIG. 1B, H-Bus™ interface 91 merely provides for communications between two busses, 81 and 82, where bus 82 may be, alternatively, another H-Bus™, or perhaps even a power line used as a bus. The bus 82 side of interface 91 will, of course, have to be adapted to the particular situation. In this situation, for example, controller 17 could connect directly to bus 82 if it were an H-Bus™, and interface 91 would not be needed.

The external interface 86 to the utility 85 in the preferred embodiment interfaces with a utility provided coaxial cable 84 although there are many ways the utility pricing signal could be fed into the system 8 (for example, RFI 86a could receive RF signals). Likewise, fiber-optic cable or the power lines themselves may be used if desired.

In some embodiments this communication can be two-way, to also provide data back to the utility. The utility may use such a system to determine which customers have active overrides of DLC signals, for example.

Many different forms of external interface may be employed without going beyond the scope of this invention and these are described in more detail below with reference to FIG. 2. The controller 87 (11) resides on both a serial bus 82 and on the power line which here is also used for communicating data. The user interface 12 preferably also resides on the same serial bus 82. A power line interface (PLI) (which may also be provided to all communicating systems on the power line) will, in the minimum configuration for using a power line interface, provide signals from the controller through the power line 83 to systems that function through power line controllers (for example, LSM controller module 88 which controls load 89). In the simplest case, a light (which might be load 89) could be turned on or off at various times of the day or according to various other factors taken into consideration by the controller 88. Many other configurations based on this example should be readily apparent to those of ordinary skill in this art.

Figure 2:
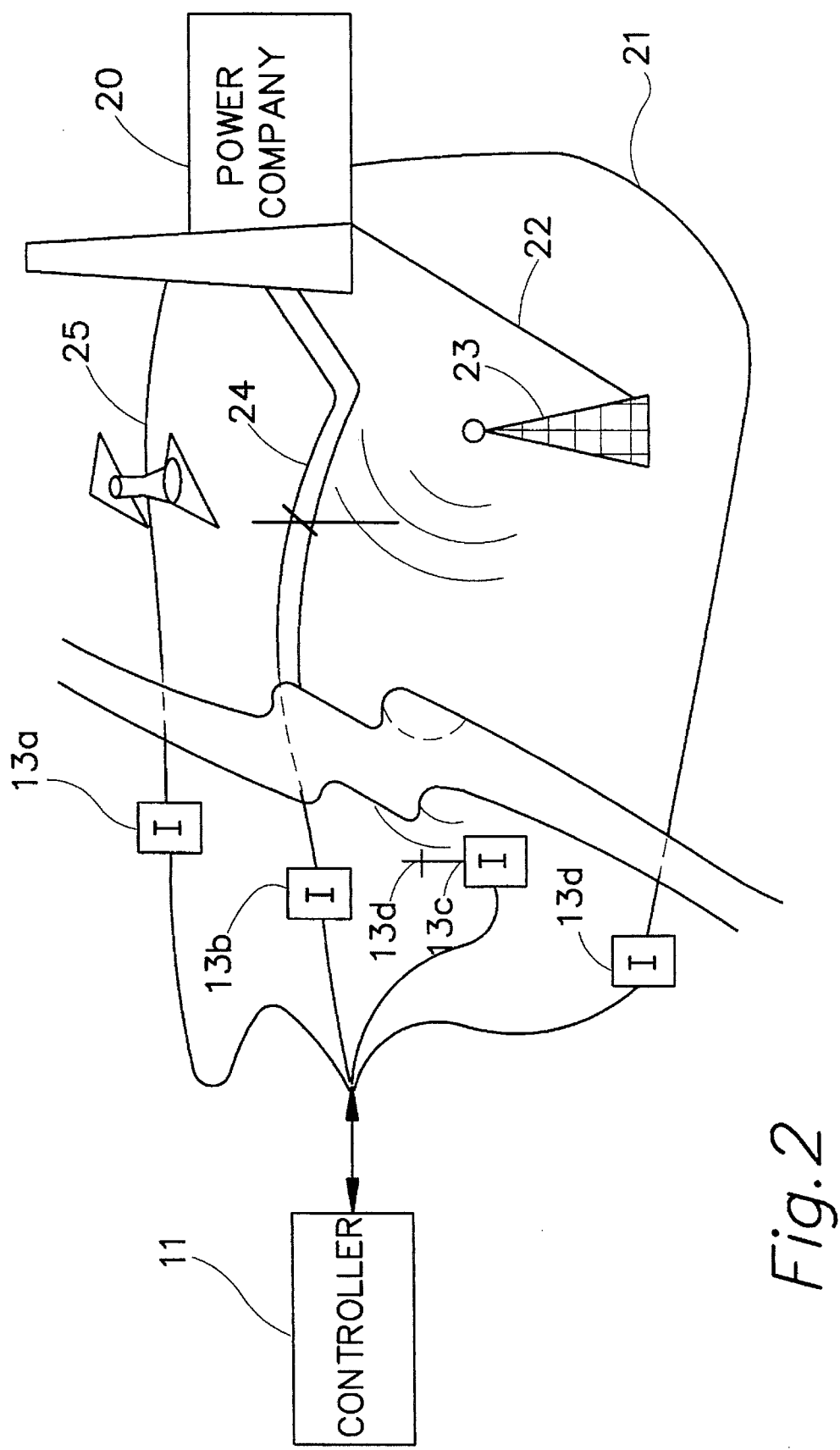
FIG. 2 is a conceptual block diagram of the power supplier's or company's interface to a controller in one preferred embodiment of the invention.

Referring now to FIG. 2, potential forms of interface from the power company 20 to the controller 11 are described. Each one of these has strengths and weaknesses which may be overcome by others. A telephone line 25 may connect an interface 13a to the controller in a house or in a building, for instance, or a direct line 21 may go directly to the interface box 13d which connects to the controller 11. If the power company opts to send signals through the power lines 24 themselves to interface box 13b, a number of problems may develop with the carrying of such signals through the transformer network currently employed by electric utility companies, for example. Some combination of power line and radio wave signals may be employed such as, for instance, having a radio receiver at every transformer in a locality wherein the radio receiver would send an appropriate signal over the power lines after the transformer into the individual's houses or buildings or, a small area may be blanketed in which each house has a box 13c with an antenna 13d which receives RF signals from an output antenna 23 from the power company on line 22. As with the previous two diagrams, many combinations of the above will occur to the designer of ordinary skill in the art without leaving the scope of this invention. In the presently preferred embodiment, the utility signals the user's facility/home/building via a coaxial cable. This signal is transferred into the facility's internal power lines, where a power line interface receives the signals.

In general, any value laden signal could be called a "tier" signal. So, for example, if the utility provider sent signals corresponding to real-time price data, the processor would have to be modified to respond to such data rather than to a "tier" level signal. It is presently felt that the simplicity provided by using a limited number of tier signals affords use of simpler processors and for that reason it is preferred. The practitioner of ordinary skill can easily adapt this invention to any type of consistent signaling mechanism.

Figure 3:
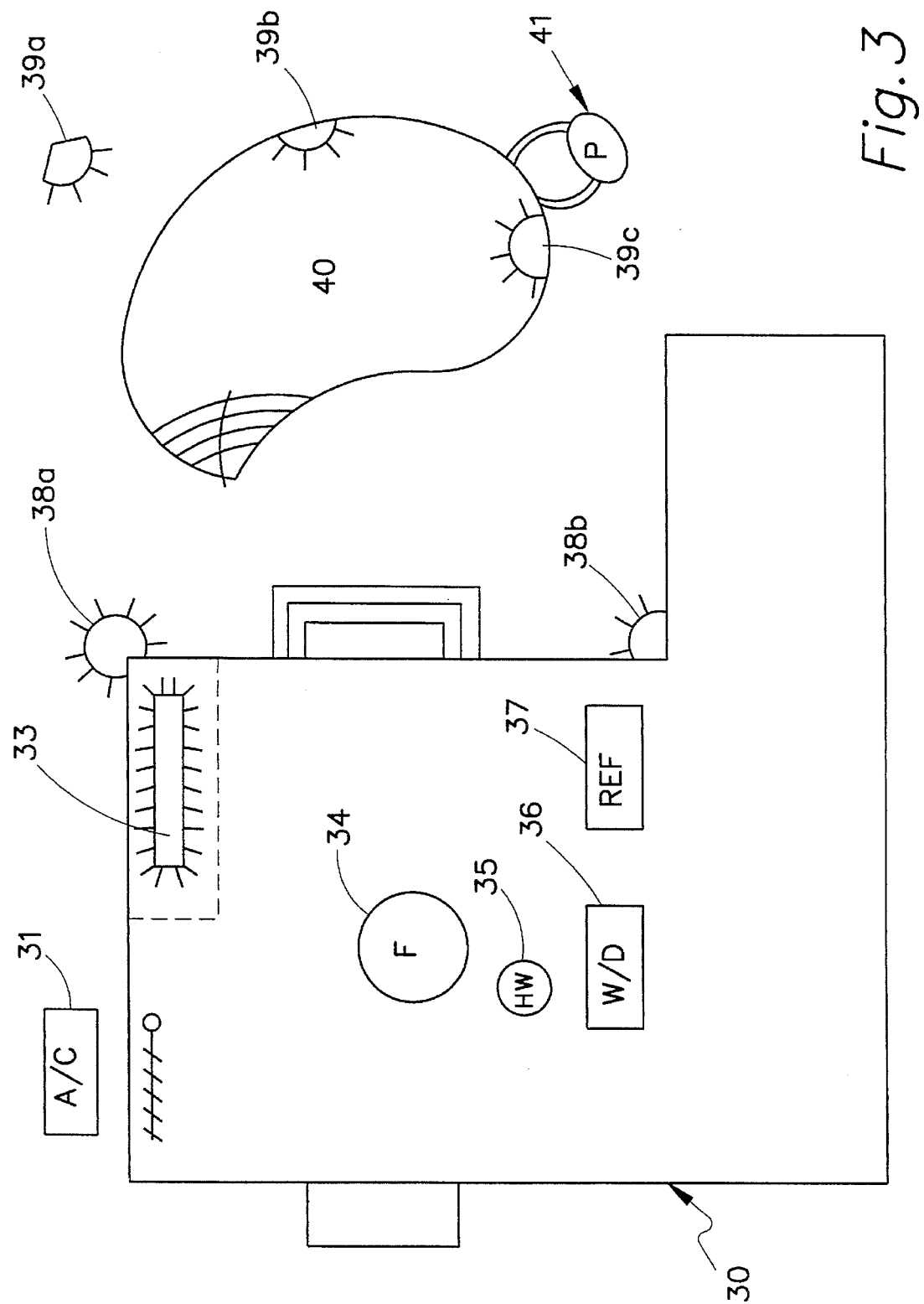
FIG. 3 is a two-dimensional overview diagram of a house which may be employed having a number of systems controllable in accord with one of the preferred embodiments of the invention.

FIG. 3 has a collapsed floor plan of a house 30 and pool 40 showing various subsystems 31–39 and 41, which are controllable through the use of this invention. The air conditioning subsystem 31 and the furnace or heating subsystem (preferably electric) 34 generally will work together through a thermostat (not shown). In sophisticated houses a vertical-blind-turning motor or curtain-moving motor 32 could be provided to reduce heat load or increase heat load provided by the sun on rooms in a building through a window. However this invention is preferably applied to, for example, various lighting subsystems which may be controlled individually such as plant lights 33 in an arboretum, exterior security lights 38a and 38c and exterior pool lights 39a–c. A hot water heater 35, washer/dryer 36, refrigerator 37 and pool pump 41 provide other examples of subsystems which may also be controlled by use of this invention if desired.

Briefly referring back to FIG. 2, it can easily be seen that various controller interfaces such as 13a, 15d, 13b and 16 may be employed for controlling these subsystems of the user's homes.

For example, the security light system 38a and 38b (FIG. 3) may be turned on at all times during the evening hours, regardless of cost, in a high-crime neighborhood. Likewise, beyond a certain price tier or level, the pool pump subsystem 41 and outdoor pool lights 39a–c would likely be turned off (shed) any time price of power for them reaches a certain tier. As would occur to the reader, there may be times that an owner/occupier of a building space would prefer to override a standard program and this can be included as well.

Some systems of the typical house however, will preferably have their setpoints adjusted rather than either being simply turned on or off based on the price point provided by a utility. The most common example currently would be the heating and air conditioning system in the typical residential home or commercial building. Typically, setback thermostats have become well distributed within the United States and are well known elsewhere. These thermostats allow for programming by the occupant to accommodate his schedule. The simplest version would have two modes or periods, a high and a low, but most have at least four. These have been called various things but commonly may be referred to as period: WAKE, LEAVE, RETURN and SLEEP, which may roughly be interpreted as warm up the house in the winter because the occupant is waking, the occupant is leaving so reduce power consumption for maintaining the comfort in a space, the occupant is returning and wants a higher level of comfort, and the occupant expects to be asleep and therefore a different temperature and comfort level is required. An exemplary unit is produced by Honeywell Inc. and goes by the trademark "Magicstat™", and provides these four modes for the occupant to program.

The invention herein, with reference to this subsystem of heating, ventilation and air conditioning (HVAC) control may operate at various levels of complexity depending upon the subsystems and controllers available in the house or building. For use with the add/shed load control, even the duty cycle may be adjusted, but in the simplest form it merely determines whether the load will be turned off or left alone.

Figure 5:
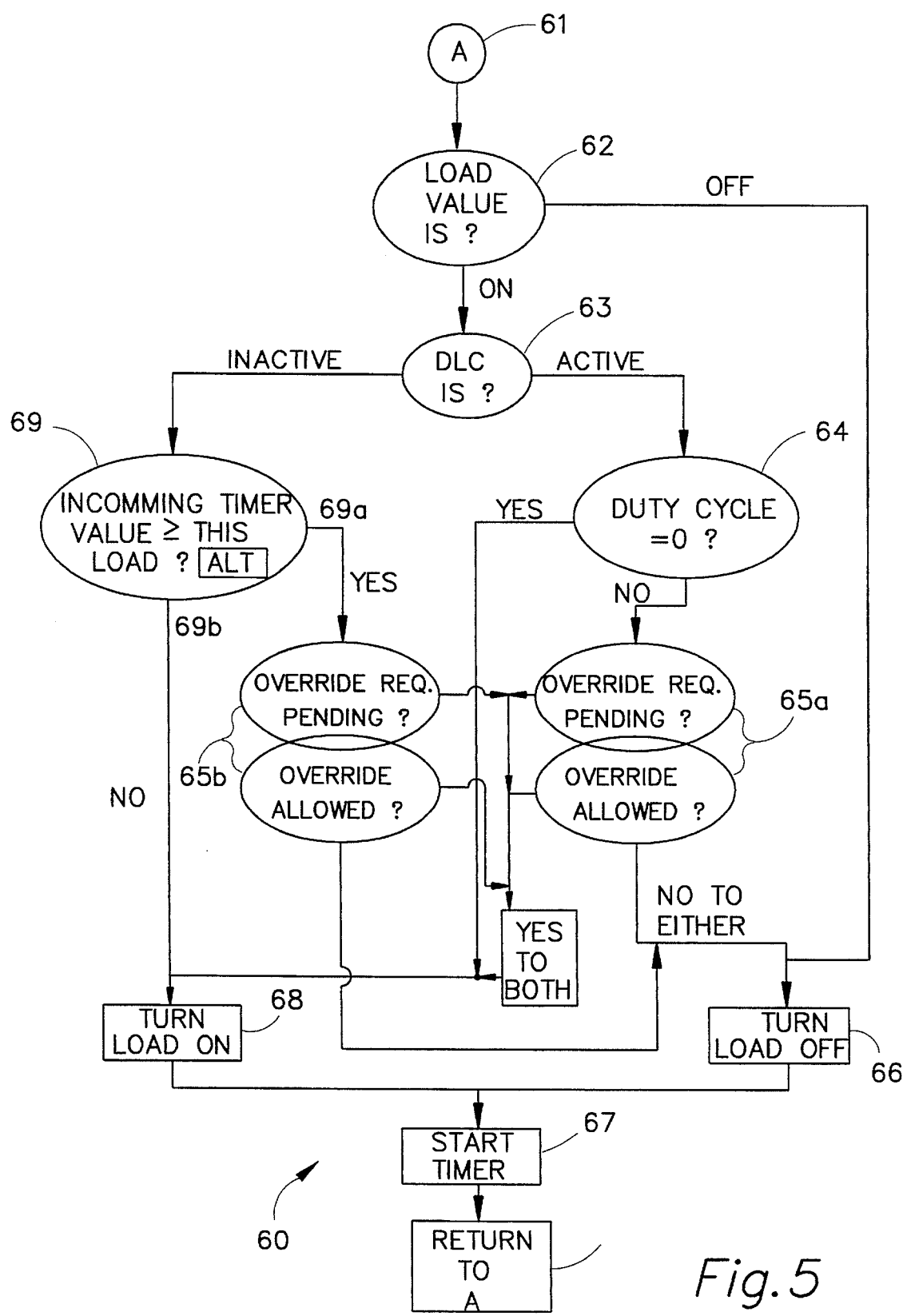
FIG. 5 is a flow diagram illustrating how a preferred embodiment uses the add/shed strategy to adjust to incoming signals.

FIG. 5 describes how the signals provided by the utility company are incorporated into a preferred embodiment system 60 with add/shed control. When the signal comes in from the utility (or at any other time chosen by the designer as appropriate to the task so long as it is close enough in time to the utility signal to be efficacious), the first load (or the next in line in the sequence, or all load processors at once if organized in parallel) gets set to an ENABLED condition and the Override condition gets set to FALSE. This process 61 may be accomplished on a processor in controller 110 in FIG. 1 or by a centralized processor which could be, for example, associated with the user interface 90 of FIG. 1A. In the preferred embodiment all the processes 61–69b are performed on a processor like processor 16 of controller 110 and the enabled and override conditions are set centrally by setting a network variable.

So, by way of example, process 62 is a process which checks the value assigned to the network variable (i.e., that collection of data signals that is stored in memory for the control system network which represents a particular load or is used by all the load controllers) and, after determining its value, assigns the processor's next process call to either process 63 if the value is "ON" (or enabled) or to process 66 if the value is "OFF" (or disabled). This kind of thing is well within the lo grasp of the ordinary practitioner in the art and is most commonly done in software within the controller unit 110.

An exemplary platform for interprocessor communication, handling network variables and other tasks is provided under the tradename "LONWORKS™" by Echelon Corporation of California. Their processor units, called Neurons™ could also perform the processes described for the load controller herein described.

Going through the FIG. 5 diagram then, if the value for the load under consideration is ON, process 63 then checks for whether there is an active direct load control (or DLC) signal from the utility. A DLC signal is an indication by the utility that it needs to exercise direct control ("Direct Load Control") over electricity usage. If this signal (again, most effectively maintained as a network variable after it's initiation into the system through a utility gateway such as EI 13 of FIG. 1), is inactive, in the preferred embodiment, then process 69 checks to see if the signal specifies or indicates a higher tier than the load under consideration and if it does, process 69 signals over 69a to indicate that the load should be shed or turned off (process 66). Otherwise this signal goes via route 69b to initiate process 68 to turn the load on or keep it on. However, before turning off the load, route 69a is taken leading through process 65b.

Process 65b checks to see first if there is a pending override request (preferably by checking a network variable) and then checks to see if overrides are allowed (on this load or at all, depending on how the user configures his system in cooperation with the utility). If, and only if both questions are answered affirmatively, then process 68 is activated. Otherwise process 66 is activated, turning the load off.

If the DLC (process 63) is "ACTIVE", then a different process is initiated. First, the process 60 checks to see if the duty cycle for its load is 0 (zero). If it is, by definition, that means the load is off (even though it's enabled) and the next process is either to turn the load off or simply restart a timer process 67.

If there is a duty cycle, process 65a checks for override requests and whether they are allowed as did process 65b. Based on the same criteria, it may activate process 66 or process 68. (If so desired, for loads to which the concepts of duty cycle is irrelevant, process 64 may be eliminated but it is preferred here since it is accomplished with a convenient programming step.

While not preferred, changing the duty cycle time for responding to recently supplied tier information signals may be done instead, or even setpoint offsets might be used in appropriate circumstances.

As an additional feature, an override request is something decided between the utility and the user. This is an accommodation to the needs of both. For example, if the user cannot afford to have the lights turned off in a part of his plant, say, during a growth cycle for some bacteria he is growing, he can negotiate with the utility provider to either put that room, via its controller, into the highest tier, which will cost something the utility and user agree to. Alternatively, the user could maintain an override, or exclude DLC from the particular subsystem altogether. If the price is too steep for the value, the consumer/customer may agree to put his lights on a cycle timer 67 that only kicks in at the highest price (for example). If the value of keeping a set of lights on is not so great, but there are certain times at which the consumer will want to keep them on, say during a pool party, the appropriate adjustment would be to allow for the utility to control the pool light load through a DLC signal, but if the rates merely climb, to allow for a user override that stops the process from shutting down these lights at times when the rates are high. This is the level of control available through the addition of processes 65a and 65b to the preferred embodiment wherein the user may negotiate whether overrides of DLC are allowed.

In general, for using the setback profile, the system may function in one of two ways. First, it may require a list of setpoints for each controlled subsystem (furnace, air conditioner, lighting systems, refrigerator cycling time, etc.) for each price point or tier which the utility may provide. Second, it may simply maintain a list of offsets for each price-point.

Figure 6:
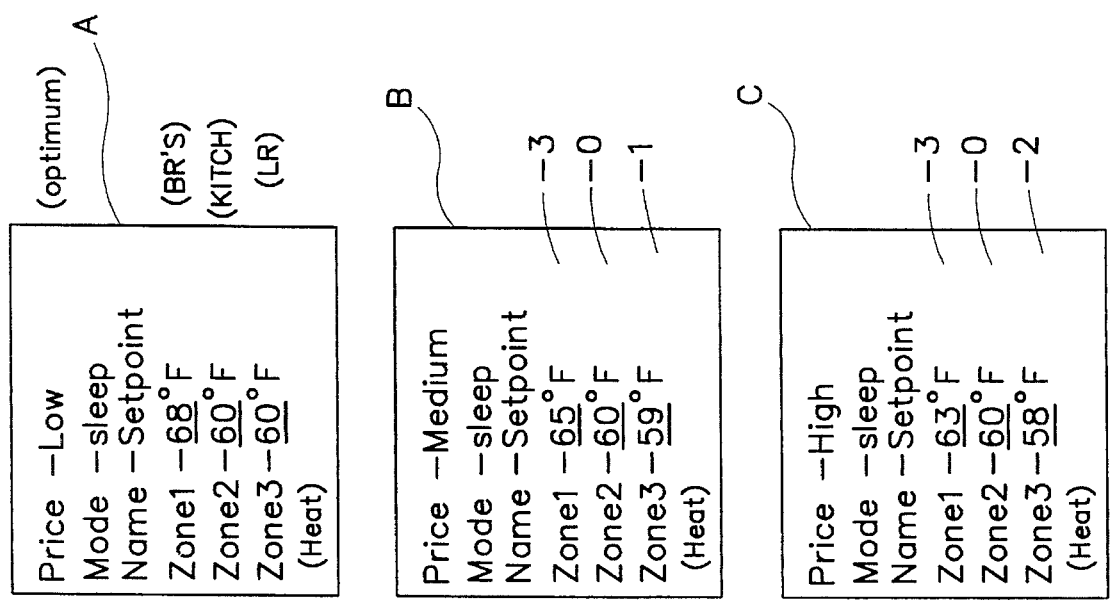
FIG. 6 is a partial example profile list representing a heating system for use in a house in accord with a preferred embodiment of this invention.
Figure 7:
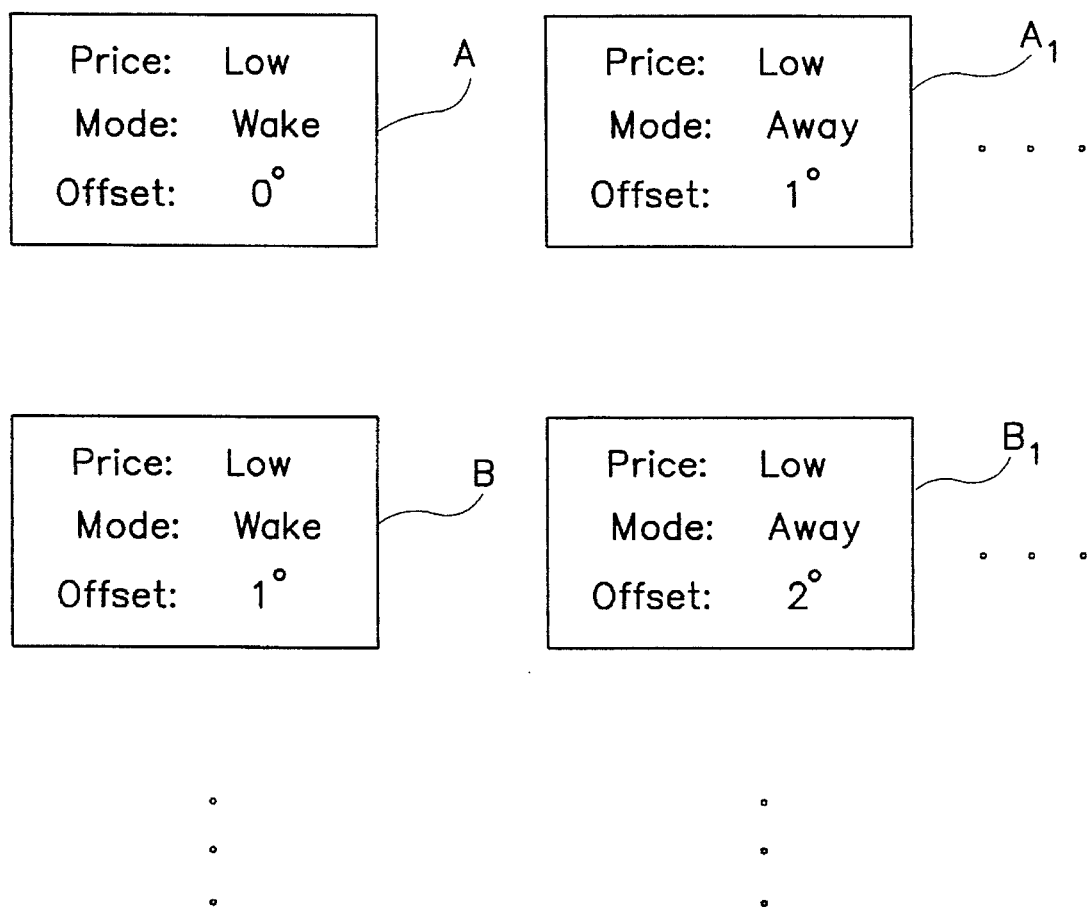
FIG. 7 is a another profile list in accord with another preferred embodiment of this invention.

For the example of the first, refer to FIG. 6 in which the profiles for four levels; A, B, C and D corresponding to low price, medium price, high price and critical are shown for the furnace. For purposes of explanation, assume this is electric furnace 34 and air conditioner 31 in house 30 of FIG. 3. Zone 1 may be the bedrooms. For user convenience, it may be called "Master BR" or some other mnemonic chosen by the user. Zone 2 may be the kitchen and zone 3 may be the dining room area. Each one of these profiles A-D should exist for each mode available to the user. In those illustrated in FIG. 5, the sleep mode is the only mode indicated. Thus, if the occupant expects to be sleeping, the temperature preferred for the bedroom at the lowest price point available from the utility (Price-Low) would be 68° for the bedrooms in this user's most desirable comfort. The kitchen and living room are not being occupied and therefore a cooler temperature may be perfectly all right for this user, 60° Fahrenheit for zones 2 and 3, respectively. This example assumes wintertime weather in which the outdoor air temperature is, perhaps, 20° Fahrenheit. Profile B shows the setpoints for the heater in the sleep mode at the medium tier price. Profile C shows the three-zone setpoints in the sleep mode at the high price point. If the utility provider so desires and there are peak demand periods which must be dealt with and users who don't deal with them through this demand-side management must pay an exorbitant price may be summarized in the profile critical—D, which in the sleep mode allows the bedrooms to reach 60° Fahrenheit and the living room and dining room area to reach 48° Fahrenheit. If a critical tier is employed by the utility provider, it may specify the setpoints itself.

For an example of the second method of profile usage, see FIG. 6 in which again a partial layout of profile (here A, B, $A_1$ and $B_1$) is shown to demonstrate the concept employed here. FIG. 6 contains two mode partial profile sets; A, B for a "WAKE" mode and $A_1$, $B_1$, to contain the information for the first two price levels for the "AWAY" mode. In this second method, note that a single offset is applied to the entire set of subsystems affected.

It is anticipated that this might, in the ordinary homestead, be limited to one or two subsystems, i.e., the HVAC and perhaps the hot water heater. In such cases where the first applications of this invention are likely to be found, it seems most advantageous not to add the memory to hold different offsets for different zones. Accordingly, this is the presently preferred embodiment.

Figure 4A:
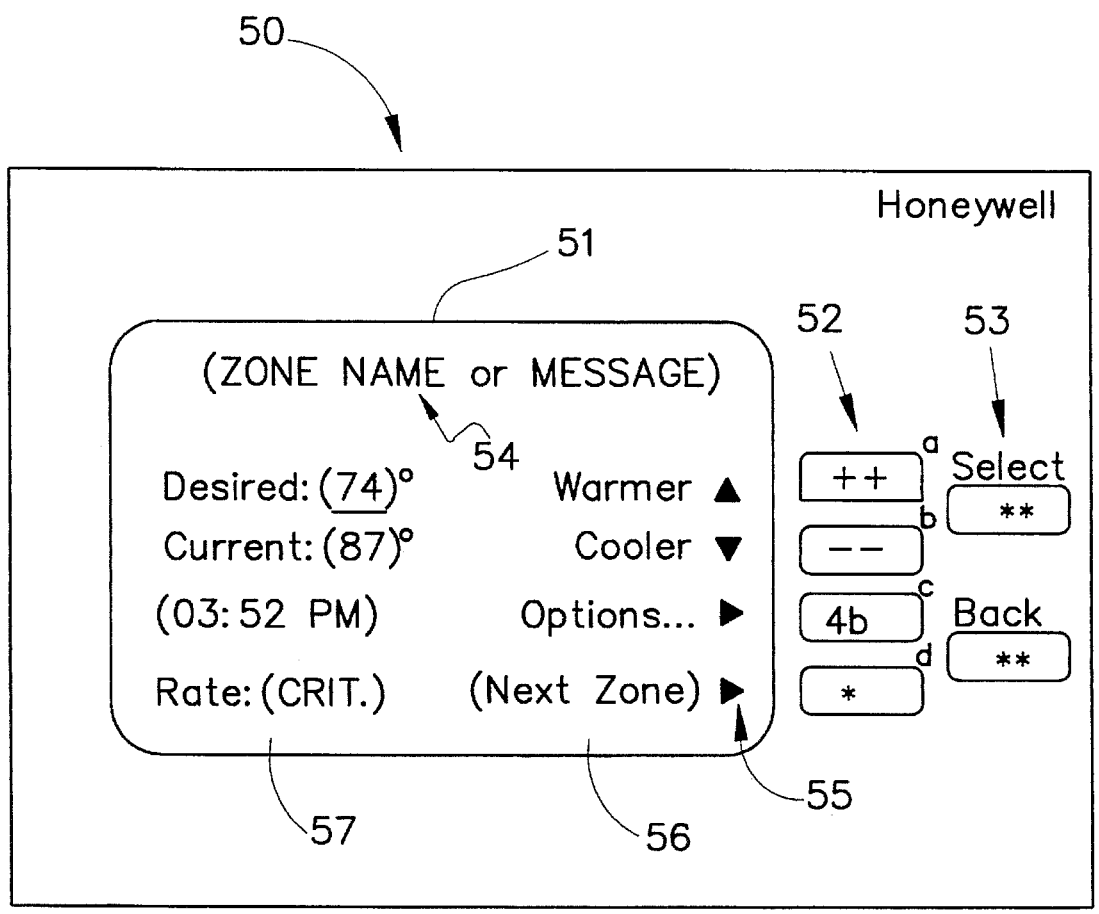
FIG. 4a is a model of the display used by one embodiment of this invention.
Figure 4B:
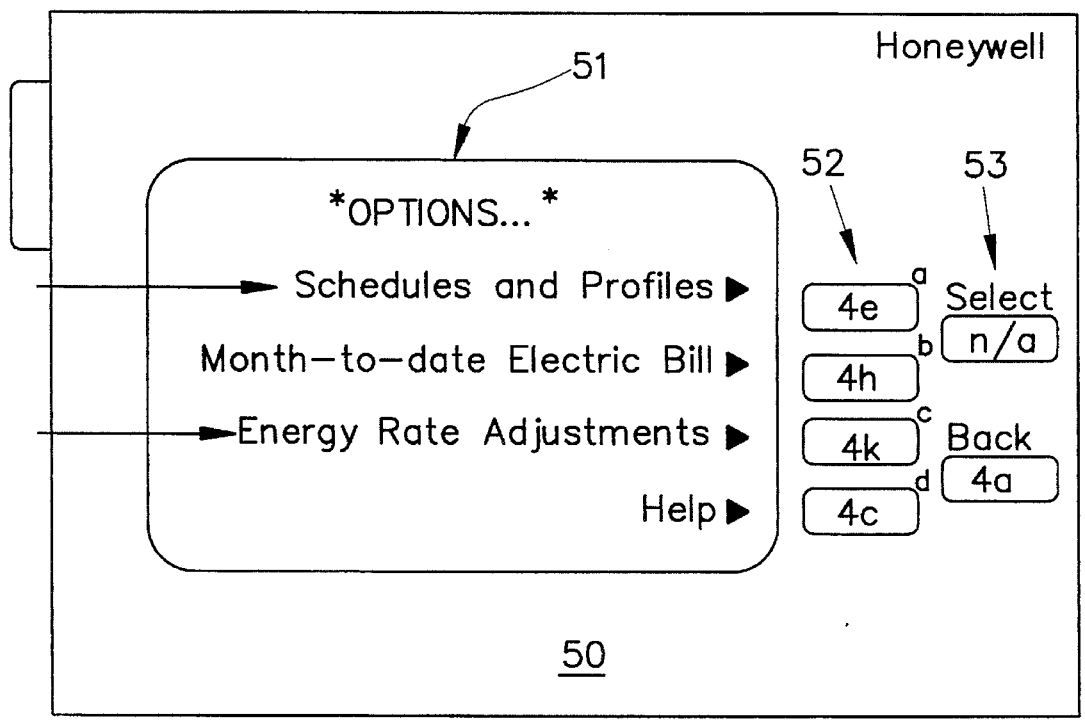
Figure 4C:
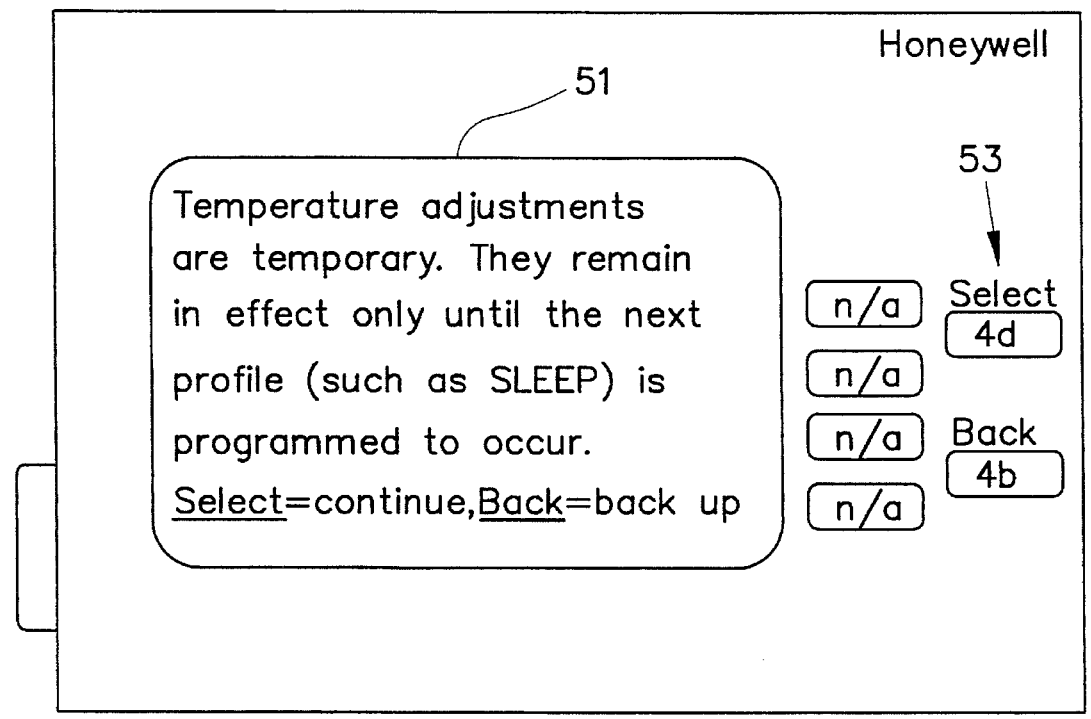
Figure 4D:
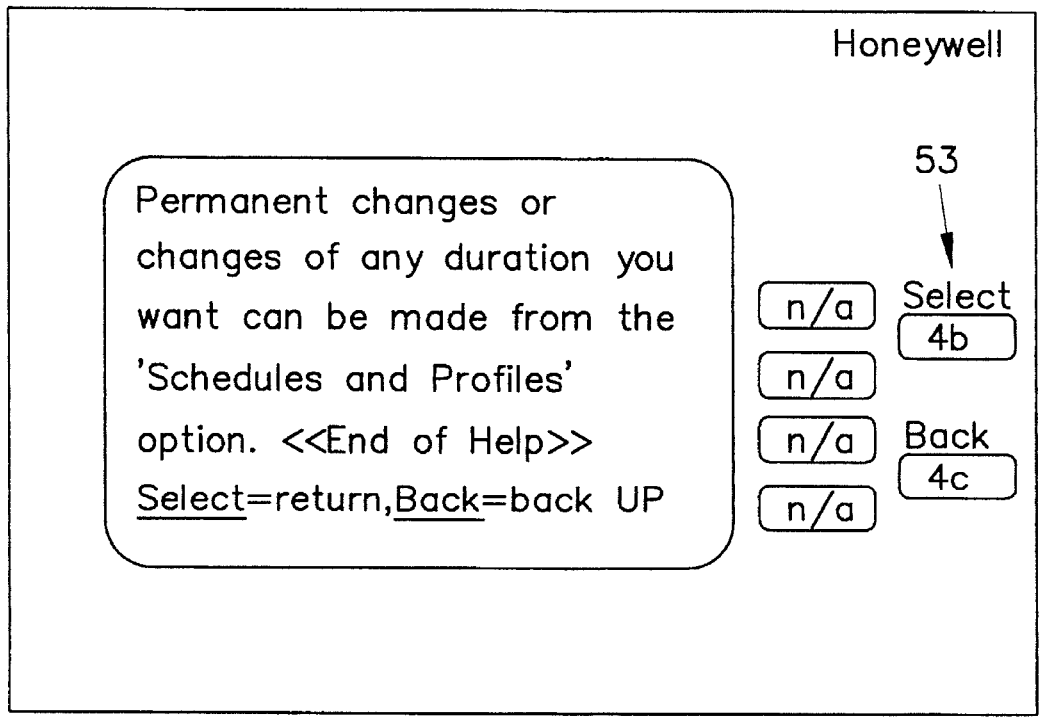
Figure 4E:
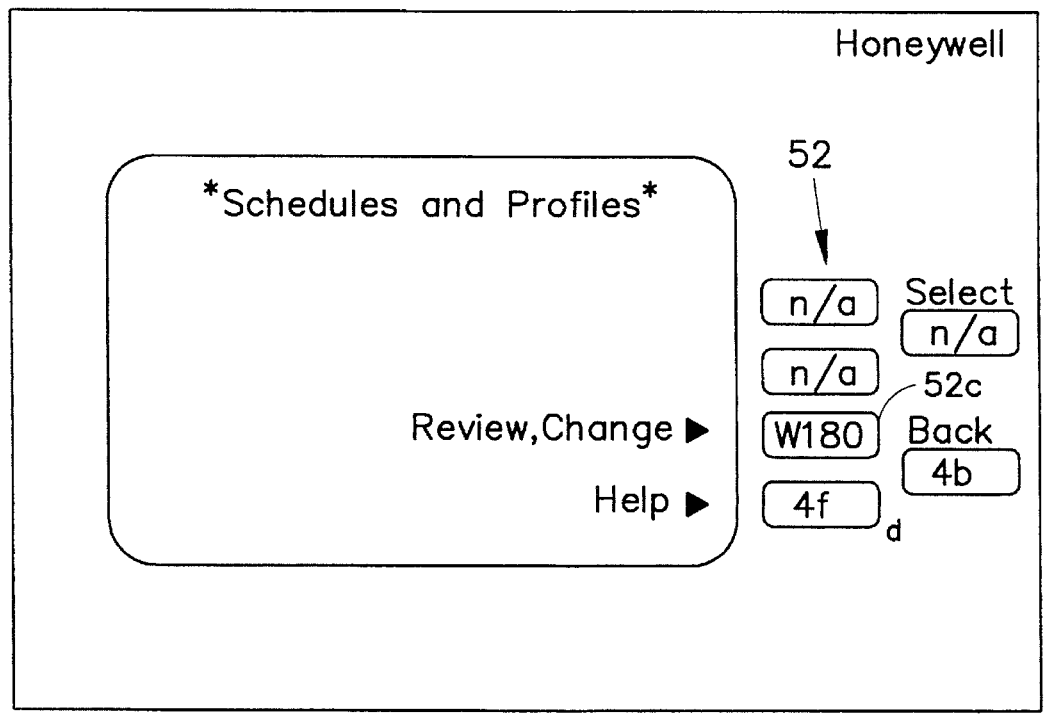
Figure 4F:
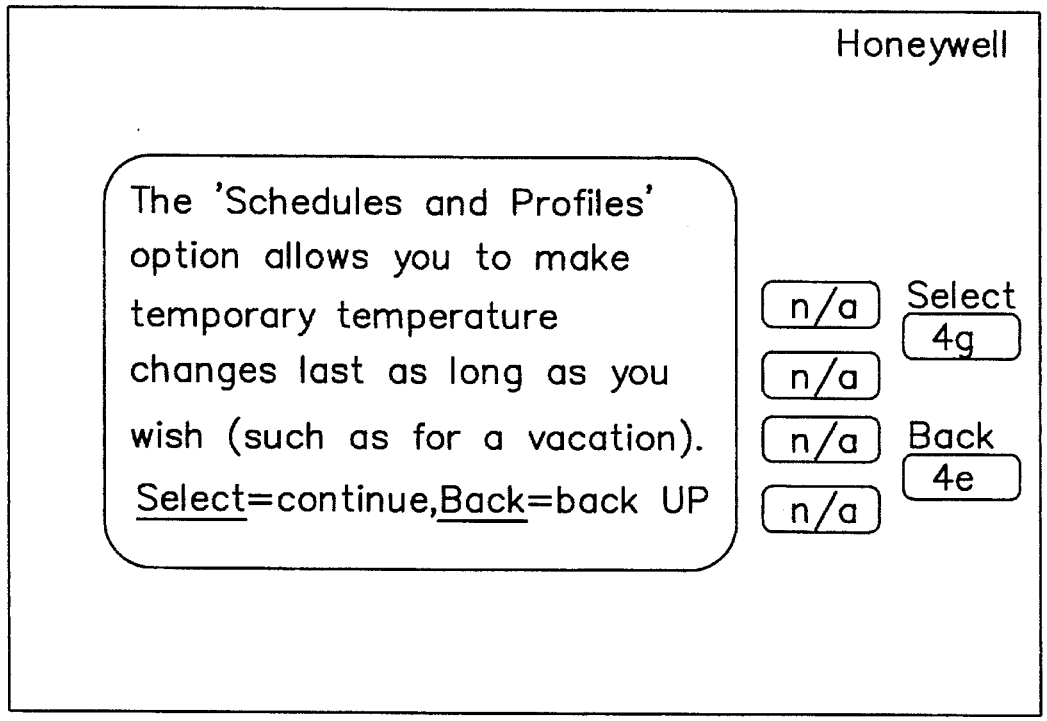
Figure 4G:
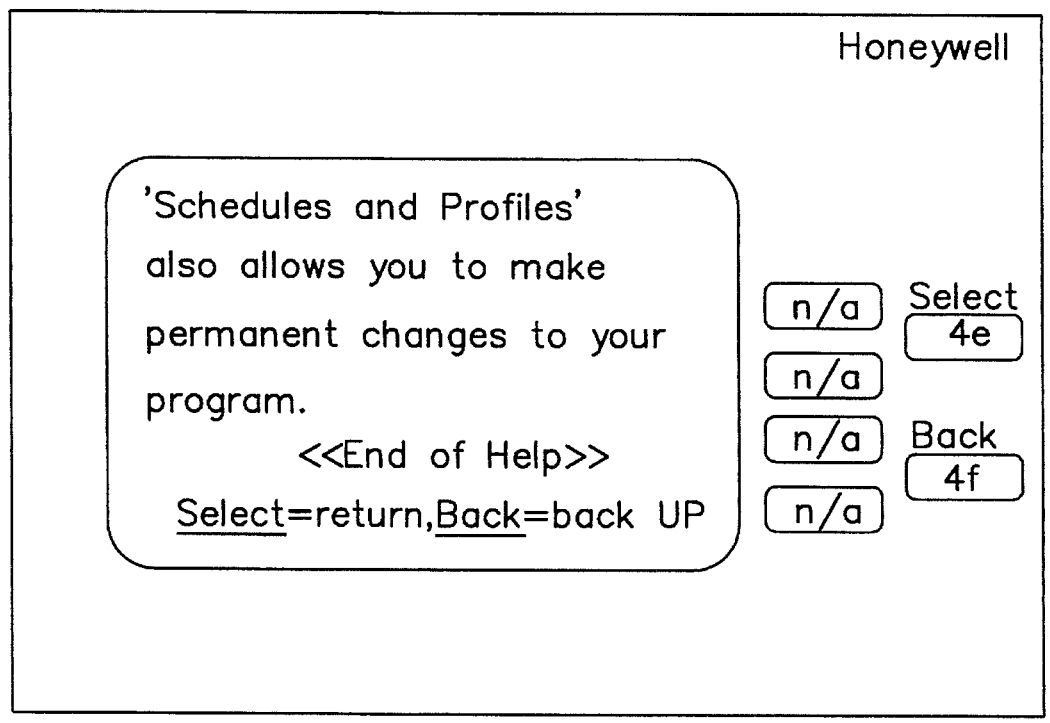
Figure 4H:
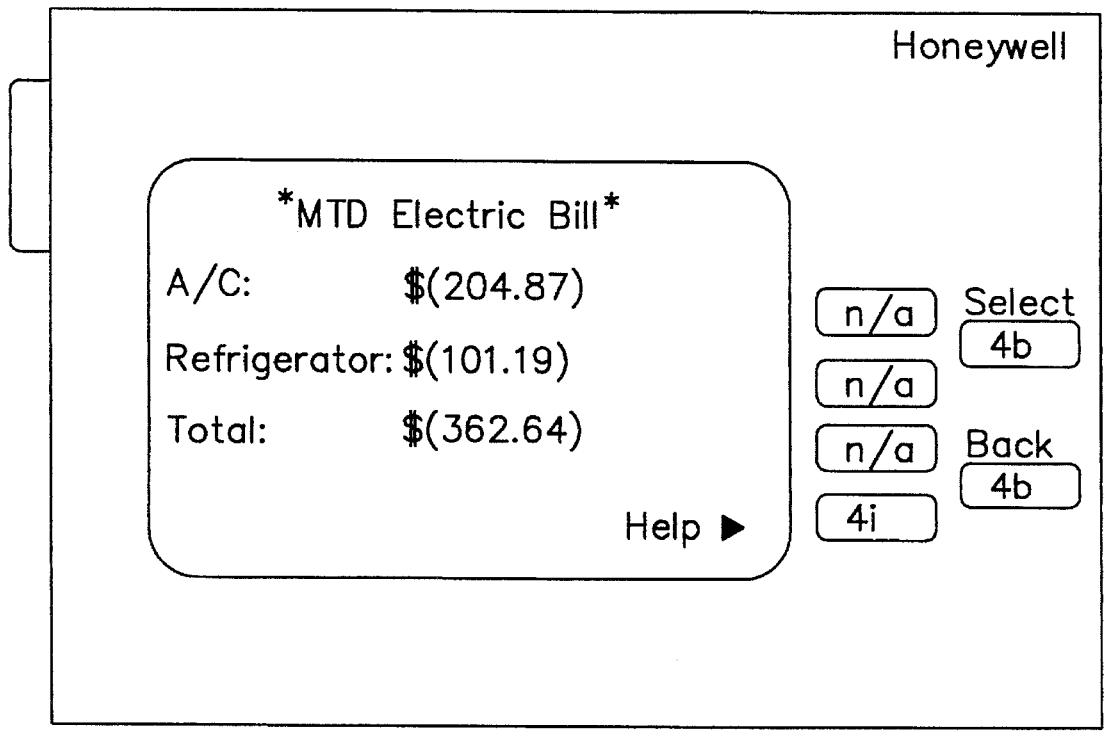
Figure 4I:
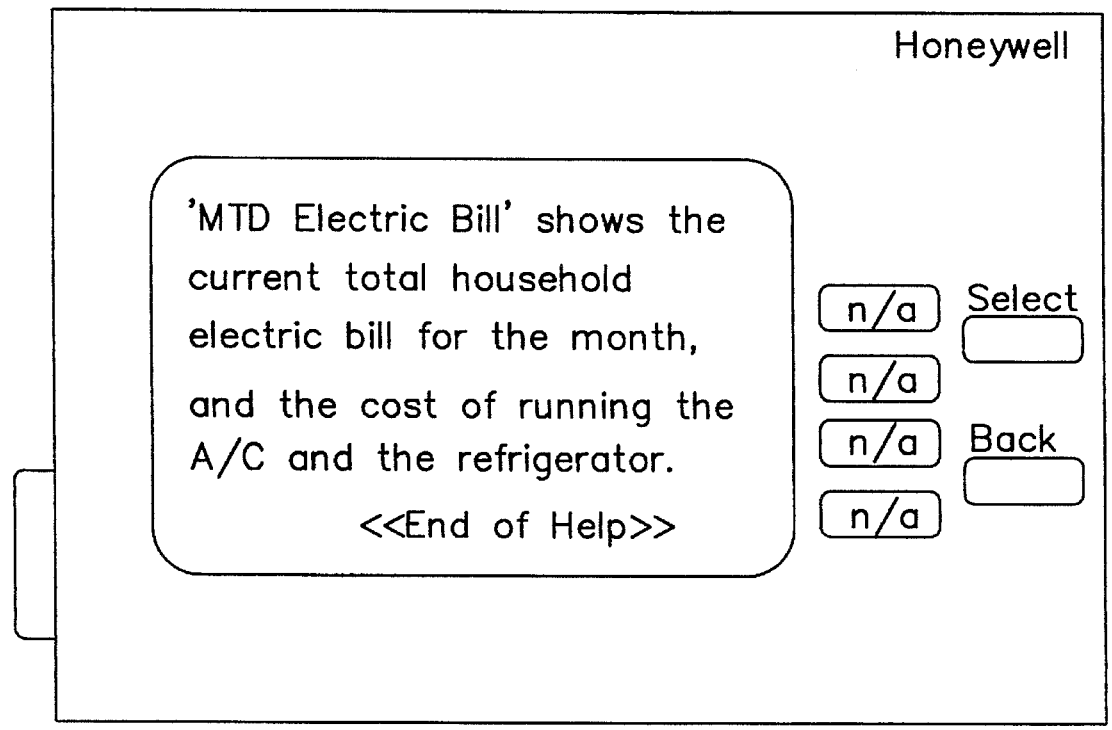
Figure 4K:
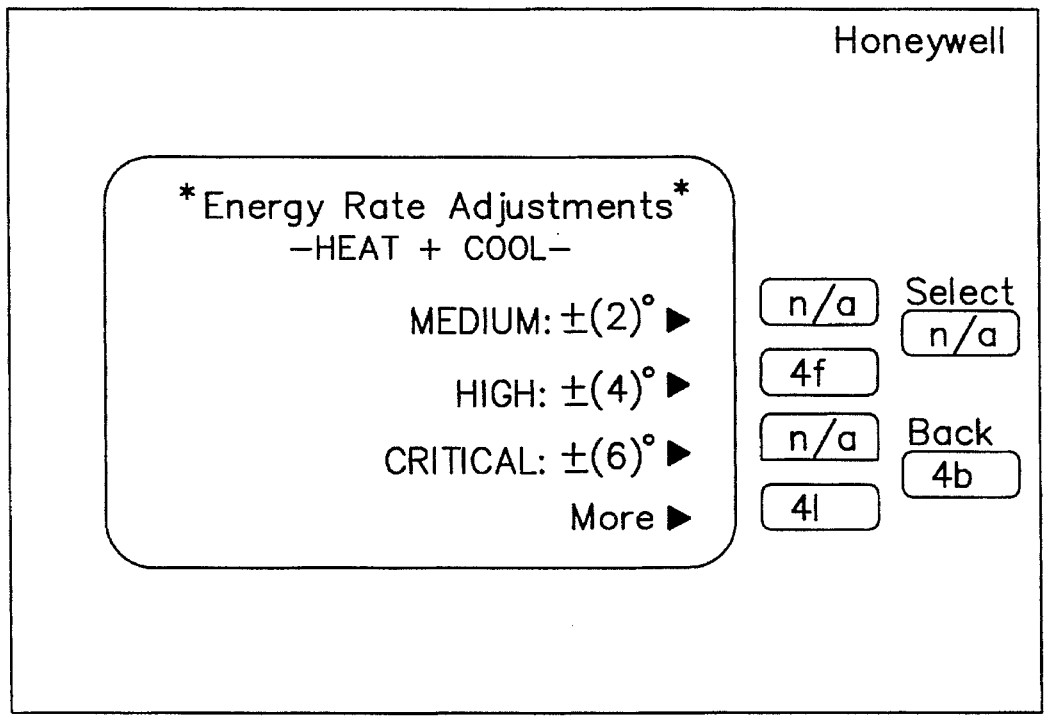
Figure 4L:
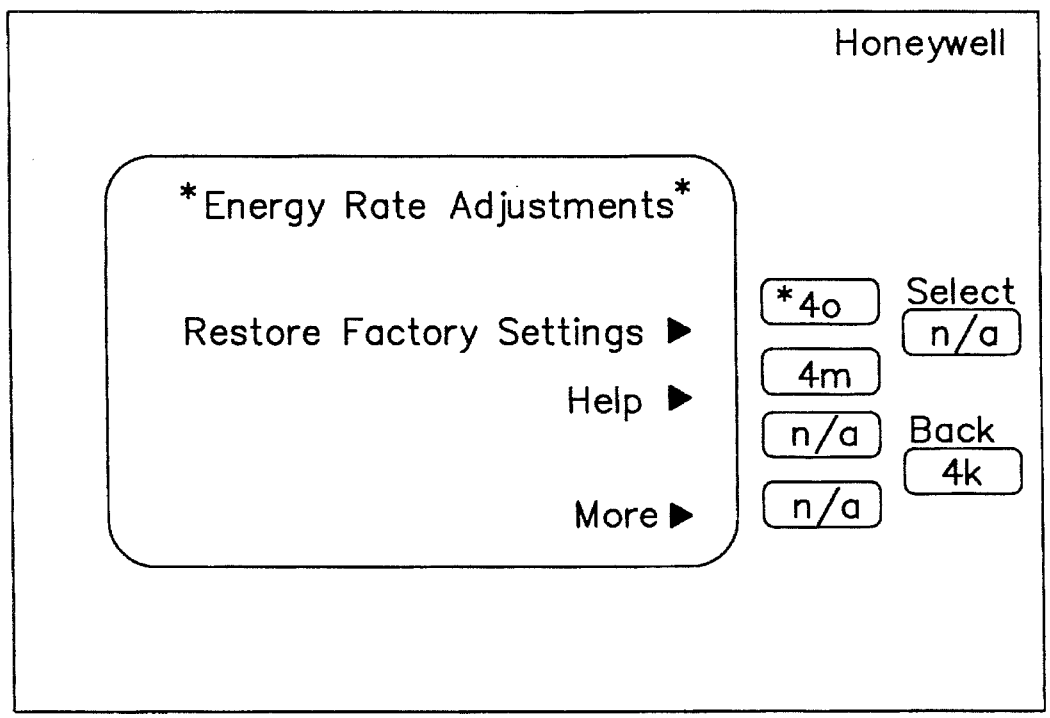
Figure 4M:
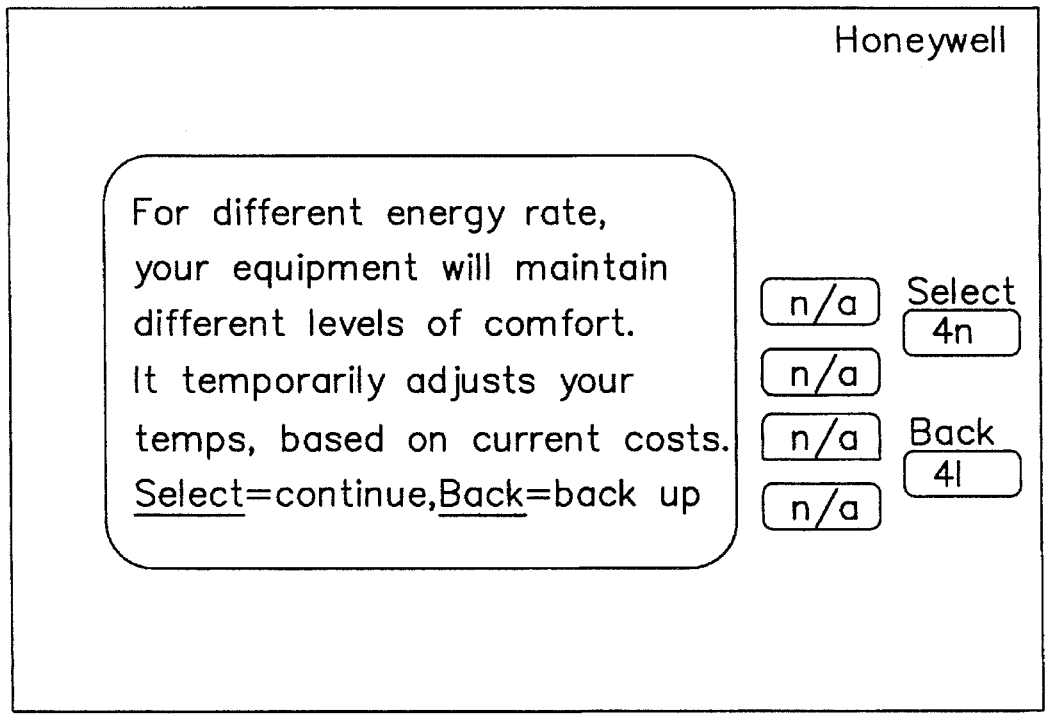
Figure 4N:
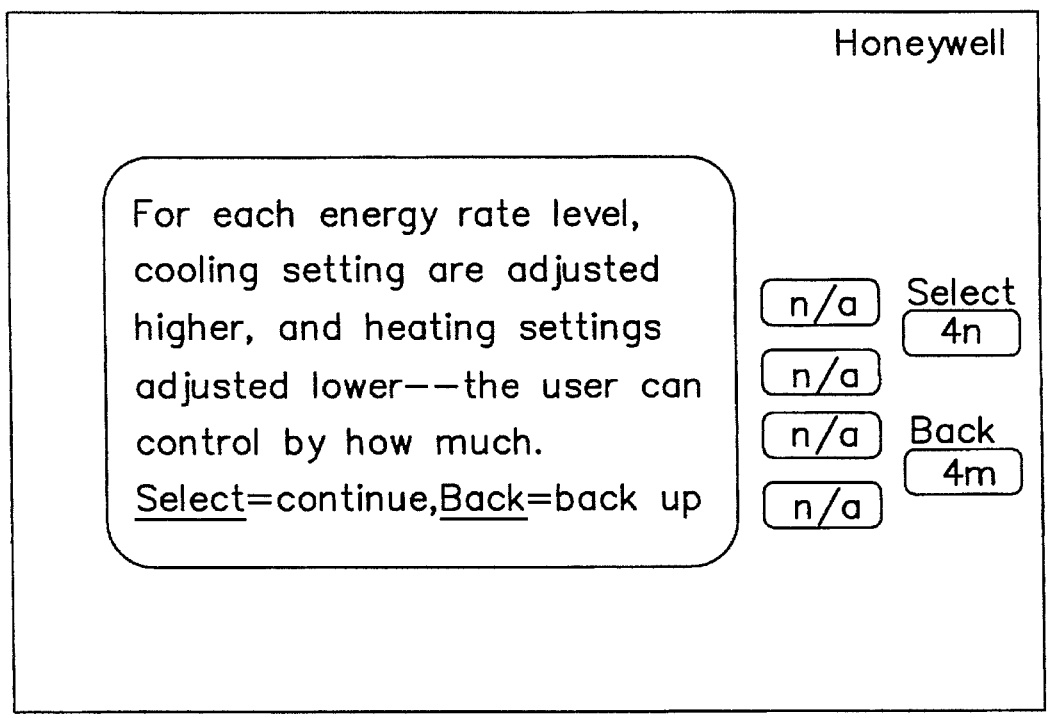
Figure 4O:
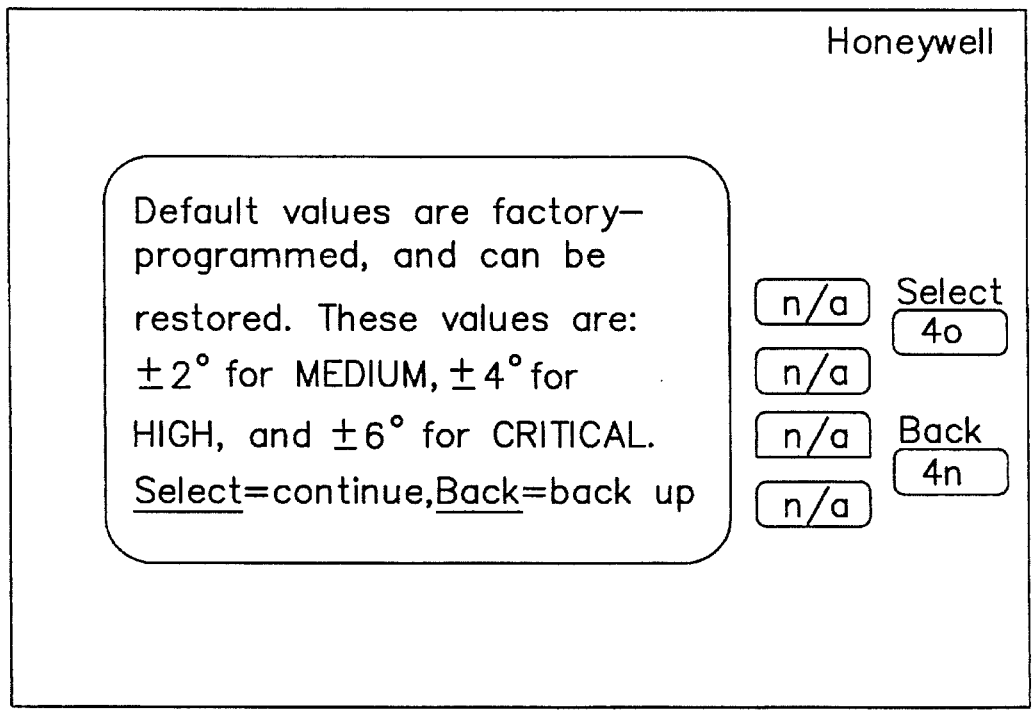
Figure 4P:
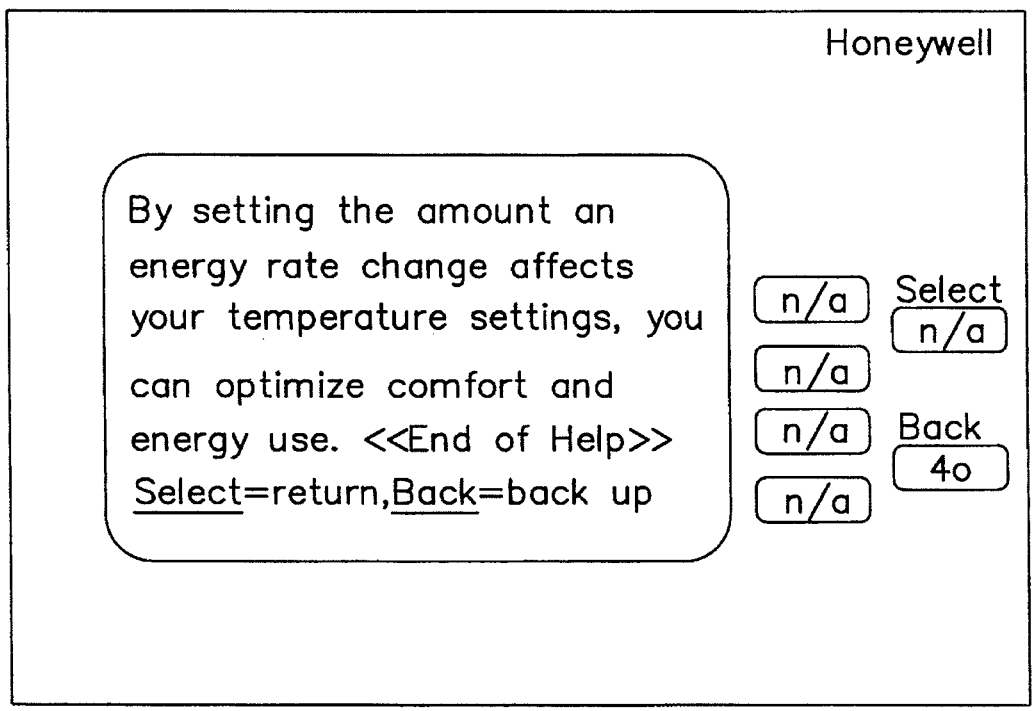
Figure 4Q:
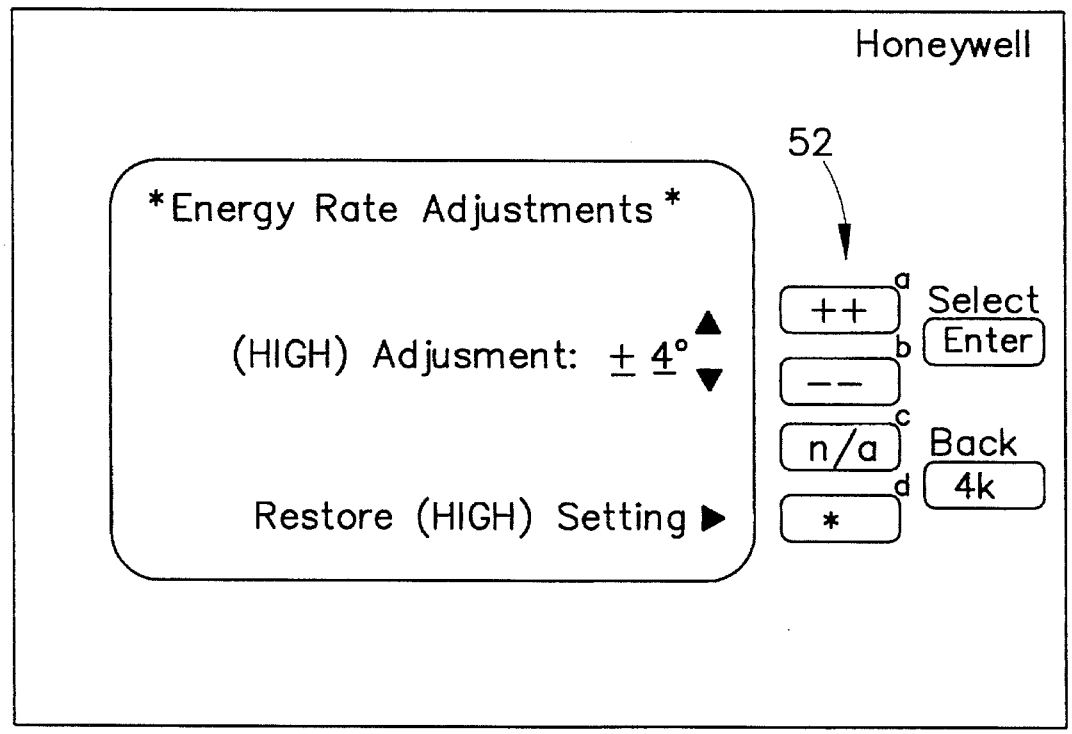
Figure 4R:
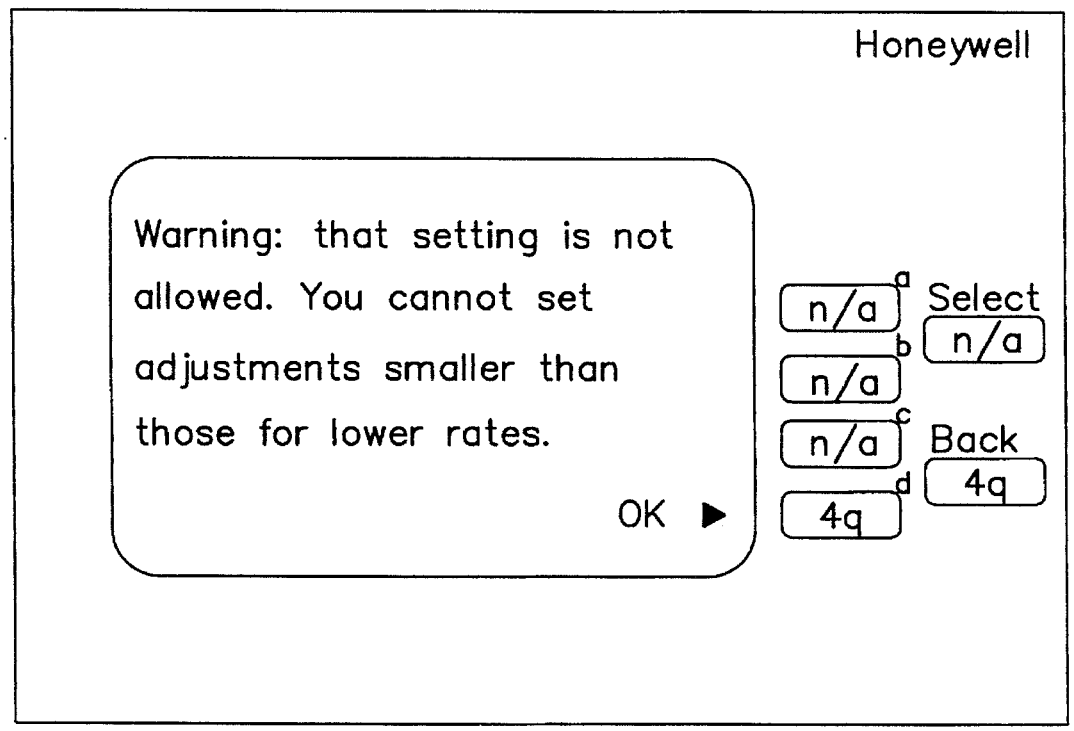

In the FIGS. 4a–r, a user interface panel 50 contains a display area 51, a set of four soft keys 52a, b, c, d, and two hard keys 53, Select and Back. Various configurations for data on the display 51 may be provided by other designers but in the preferred embodiment, arrows or other symbols 55 indicate the functions of the soft keys 52a–d by reference 56 associated with each such symbol 55. Where a display merely indicates information about the user's options, such as a help screen, a display configuration such as that shown in FIG. 4c may be provided in the preferred embodiments. In other cases, information 57 and a zone name or message 54 is preferably provided on the display 51 as in FIG. 4a. For ease of explanation, keys 52 and 53 contain information regarding their function which would not generally be available to the user. (For example, in FIG. 4a, key 52a has two "+" signs indicating that the function of softkey 52a is to increase the amount of warmth, and key 52b has two "–" signs to show that the amount of warmth should be decreased and that the setpoint should be reduced. These "++" and "––" keys will not be on the user touch pad but are included in these drawings to provide redundant information to the reader in order to facilitate the grasp of the inventive concepts of this document).

The use of softkeys allows the user to control it without requiring a complicated or expensive user interface such as a general-purpose computer. However, general purpose computers or other interface devices may be used if desired. Also if desired, the utility may provide for the actuation of particular profiles within individual spaces or homes directly, but this would require such a utility to maintain an active database and provide a method by which the users could modify that database to their own desires on some kind of acceptable basis.

Other symbols drawn onto the keys such as in FIG. 4b indicate that a display is available at another level. N/A would indicate that that particular key cannot perform any function with this particular display. N/S indicates a feature not shown or described.

Stating with the display on panel 50, the user is provided with "options" to review schedules and profiles by selecting softkey 52a "month-to-date-electric bill" by 52b, "energy rate adjustments" by 52c, and "help" by key 52d. In this level the user may go back to the display of FIG. 4a by pressing the key 53 "back". No other options are available to the user from the panel as set up in FIG. 4b.

In FIG. 4c, a help screen would be the result of the user selecting softkey 52d in FIG. 4b. By selecting key 53 "select" the user would be moved to review the display of FIG. 4d which concludes the information available for this help function.

Moving on to FIG. 4d (the next level inward), the user would then select key 53 "back", leading him to the display illustrated in FIG. 4e to review the schedules and profiles. Another help screen is available by selecting key 52d at this stage, and a connection to the controller may be had by the user by selecting key 52c. FIGS. 4f and 4g show the help screens available from FIG. 4e. FIG. 4h shows an electric bill. FIG. 4i shows the user what this means. FIG. 4k shows the user what his energy rate adjustments are for heating and cooling, allows him to select more energy rate adjustments by pressing key 52d, or changing the adjustments for the heating and the cooling by selecting softkeys 52a–c. Only the "high" rate setting is shown in these figures.

In FIG. 4l, the user is allowed to go back to factory settings if desired. In FIGS. 4m–p, this is all explained (a "help" function).

By use of a simplified user interface such as the one described in these figures, user options may also be limited if desired, but they are not in the preferred embodiment. For example, in FIG. 4q, it can be seen how the user would adjust for the high adjustment for the option of FIG. 4k.

In FIG. 4r, the user can be shown that he is trying to exercise control beyond the limits agreed to between himself and the utility. The display of FIG. 4r, in the preferred embodiment, will appear whenever the user attempts to go beyond his pre-agreed limits. This type of display may be used for other than profile out of bounds commands too. For example, the user may attempt to override a DLC signal at a time or for a load for which this is not permitted under the agreement with the utility. In such event a screen that says "direct control of this load is not permitted at this time" would be an appropriate form of message.

Having set out the various elements of the system and how the interface with the user should operate in a preferred embodiment of the invention and described how a multiplicity of alternative arrangements may also be preferred and within the scope of the present invention, a detailed descriptive of the interactive operation of the system can be had.

While the FIGS. 4a–r provide a generalized set of displays for interfacing to a control system, other options are available.

Using an interface like the display of FIGS. 4a–r for add/shed control are convenient for complex systems, however, a less expensive alternative is available. If the user, for example a home owner, has only one or two systems that require or are amenable to load/shed control, he may prefer to simply interface directly with the load controller (LSM of FIG. 1B, [Direct Control Interface DC and Switch SW] 1A). For this purpose, a user interface consisting merely of a switch/button, or other user control could activate or deactivate any of the features described with reference to the processor's of process 60 in FIG. 5. To avoid any user contact, the utility may, if preferred, simply agree to install a hard-configured controller that, for example, does not allow for overrides or that controls through overrides through process 65b. A myriad of combinational variations occur to those of ordinary skill in the art when presented with these options.

To describe the interactive operation of the system vis-à-vis the user and utility, an example of add/shed control follows. If at 12 midnight an electric utility were to pull substantial load generation capacity offline, say, for maintenance, it would then send out a "top tier" signal over whatever communication pathway (FIG. 2) has been selected by the power company 20 to the utility interface to the customer's home, building, business or industrial facility (external interface, i.e., 13, FIG. 1 and 1a). A controller (which may be located in box 80 or 90 for instance) receives this information over bus 17 or directly from the external interface 13, it puts this out as a network variable to the add/shed controllers 110–110n. Each of the add/shed controllers then (after time-out is complete if one were pending) executes the processes described with reference to FIG. 5, starting at process 61.

The invention should not be considered limited, except as set forth in the following appended claims.

We claim:

1. Method for cooperatively controlling individual user premise subsystems each of which is controlled by controllers, said method comprising:

receiving information signals from a utility provider at the user premise,

Interpreting the information signals to provide a value to the controllers, making the interpreted signals available to controller processors which control subsystems in the user premise, for a processor receiving said interpreted signal which has access to and employs information in memory regarding setback profiles for its subsystem, then having such processor locate a value match in the setback profile memory locations for the value indicated by said utility information signal, and then controlling its subsystem with that matching value by using the matched values to generate a setback delta value and forwarding it as a signal to the subsystem controller, and for a processor which accesses tier information in a memory location for its controlled subsystem (such subsystem's energy usage state being called its controlled state), then having such processor compare the predetermined tier value of such subsystem to the information signal provided by the utility, and if the subsystem value is greater, doing nothing with regard to changing the control state of such subsystem, else changing the control state of such subsystem.

2. A Method for cooperatively controlling a community of individual user premise subsystems each of which is controlled by controllers on a substantial portion of said community of user premises, said method comprising:

sending information signals from the utility provider for the community which contains at least one of the following values: DLC, tier, time, real-time and price, receiving said information signals from said utility provider at the user premise, interpreting the information signals to provide a value to the controllers, making the interpreted signals available to controller processors which control said subsystems in said users' premises, and if a processor receiving said interpreted signal has access to information regarding setback profiles for its subsystem, then having such processor locate a value match in the setback profile for the value indicated by said utility information signal, and then controlling its subsystem with that matching value by using it to generate a setback delta for the subsystem controller and providing it to said controller, and if the processor is one which does not access profile information for its subsystem, then having such processor compare the predetermined tier value of its subsystem to the information signal provided by the utility, and if its value is greater, doing nothing, else turning off the subsystem for which it is responsible.

3. A Method for cooperatively controlling a community of individual user premise subsystems each of which is controlled by controllers on the user premise, said method comprising:

sending information signals from the utility provider for the community which contains at least one of the following values: DLC, tier, time and price, receiving said information signals from said utility provider at the user premise, interpreting the information signals to provide a value to the controllers, making the interpreted signals available to controller processors which control subsystems in the user premise, if a processor receiving said interpreted signal is responsive to DLC commands, then causing said responsive processor's subsystem to respond to said DLC command if it is contained in said interpreted information signal, else, if a processor receiving said interpreted signal has access to information regarding setback profiles for its subsystem, then having such processor locate a value match in the setback profile for the value indicated by said utility information signal, and then controlling its subsystem with that matching value by using it to generate a setback delta for the subsystem controller and providing it to said controller, and if the processor receiving said interpreted signal is one which does not access profile information for its subsystem, then having such processor compare the predetermined tier value of its subsystem to the information signal provided by the utility, and if its value is greater, doing nothing, else turning off the subsystem for which it is responsible.

4. The method of claim 3 wherein the user's selection of an override request for override of incoming DLC signals allows the controller to ignore an incoming DLC signal.

5. The method of claim 4 wherein only some controllers on the user premises may allow override requests.

6. The method of claim 4 wherein the user premise interface to the utility reports to the utility any time a user has overridden a DLC.

* * * * *

UNITED STATES PATENT AND TRADEMARK OFFICE
CERTIFICATE OF CORRECTION

PATENT NO. : 5,598,349
DATED : January 28, 1997
INVENTOR(S) : Kurt L. Elliason,

It is certified that error appears in the above-indentified patent and that said Letters Patent is hereby corrected as shown below:

On title page, item [75] should read:
Inventors: Kurt L. Elliason; Robert J. Schnell both of Plymouth,
Minnesota; Philip J. Bohrer of Edina, Minnesota;
Gregory J. Merten of Eagan, Minnesota Signed and Sealed this Fifteenth Day of July, 1997

Attest:

BRUCE LEHMAN

*Attesting Officer*     Commissioner of Patents and Trademarks